United States Patent
Kubacki

[11] 4,096,315
[45] Jun. 20, 1978

[54] PROCESS FOR PRODUCING A WELL-ADHERED DURABLE OPTICAL COATING ON AN OPTICAL PLASTIC SUBSTRATE

[75] Inventor: Ronald M. Kubacki, Cupertino, Calif.

[73] Assignee: The United States of America as represented by the Administrator of the National Aeronautics and Space Administration, Washington, D.C.

[21] Appl. No.: 750,655

[22] Filed: Dec. 15, 1976

[51] Int. Cl.² ............................................. B32B 27/36
[52] U.S. Cl. .................................... 428/412; 351/166;
427/38; 427/41; 427/44; 427/164; 427/302;
427/322; 427/387; 428/447
[58] Field of Search ................. 427/34, 38, 41, 162,
427/164, 299, 302, 375, 387, 44; 428/412, 447;
351/166

[56] References Cited
U.S. PATENT DOCUMENTS

| | | | |
|---|---|---|---|
| 2,428,357 | 10/1947 | Cohen et al. | 427/164 X |
| 3,111,424 | 11/1963 | Le Clair | 427/38 X |
| 3,450,465 | 6/1969 | Prance et al. | 428/412 X |
| 3,477,902 | 11/1969 | Tomasino et al. | 427/38 X |
| 3,707,397 | 12/1972 | Gagnon | 427/387 X |
| 3,746,567 | 7/1973 | Nordstrom | 428/447 X |
| 3,822,928 | 7/1974 | Smolinsky et al. | 427/38 X |
| 3,829,324 | 8/1974 | Blais et al. | 427/44 X |

Primary Examiner—Ronald H. Smith
Assistant Examiner—Dennis C. Konopacki
Attorney, Agent, or Firm—Darrell G. Brekke; Robert F. Kempf; Robert Kinberg

[57] ABSTRACT

A process for coating an optical plastic substrate, for example polymethylmethacrylate (PPMA), with a single layer coating for the purpose of improving the durability of the plastic, the coating being deposited by a low temperature plasma polymerization process.

22 Claims, 1 Drawing Figure

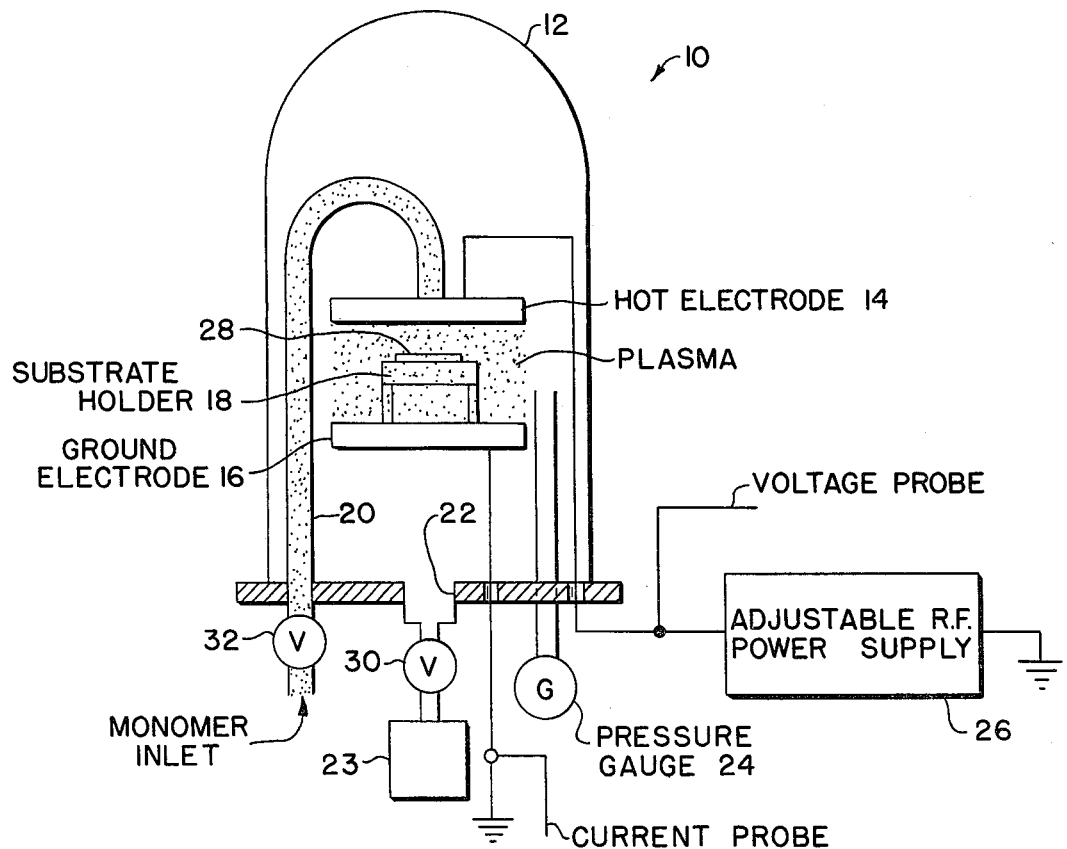
FIG.—1.

PROCESS FOR PRODUCING A WELL-ADHERED DURABLE OPTICAL COATING ON AN OPTICAL PLASTIC SUBSTRATE

The invention described herein was made in the performance of work under a NASA contract and is subject to the provisions of Section 305(a) of the National Aeronautics and Space Act of 1958, Public Law 85-568 (72 Stat. 435; 42 U.S.C. 2457(a)).

BACKGROUND OF THE INVENTION

The invention relates to abrasion resistant coatings and methods for their application, and more particularly to a well-adhered abrasion resistant coating for plastics.

Traditionally, glass lenses have been used in cameras, projectors, telescopes and other optical instruments. Recent developments have shown that lenses can be prepared from thermal plastics by injection molding. The primary advantages of producing lenses by injection molding are that the lenses have a low material cost, are light weight and only require the use of unskilled labor to be produced since the lenses are in a finished state when released from the mold. Such injection molded lenses are highly resistant to shattering and do not require any subsequent milling, grinding or polishing after the molding step. Such lenses are, however, not durable, and tend to scratch easily under routine cleaning.

One way of protecting the plastic lenses is to coat them with an abrasion resistant material. The problem has been to find a suitable material which is both abrasion resistant and yet durable and well-adhered to the plastic. Many suitable coatings such as the type of coatings which are put on glass to act as anti-reflection coatings are difficult to put onto an injection molded plastic lens because of the requirements of the coating process. For example, glass lenses are typically coated with a single layer anti-reflection coating of magnesium fluoride ($MgF_2$). Magnesium fluoride is deposited on the glass lens by vapor deposition, that is, by vaporizing magnesium fluoride in a vacuum chamber and then allowing the vapor to contact the heated lens. The lens must be heated to approximately 300° C. This elevated substrate temperature is required to improve adhesion and durability of the magnesium fluoride coating to the glass surface.

Depositing magnesium fluoride on plastic lenses by vapor deposition is unsatisfactory because thermal plastics generally cannot withstand the high temperatures required for satisfactory adhesion and durability of the magnesium fluoride coating. Also, such coatings tend to show restricted performance during environmental testing due to poor adhesion.

If a soft magnesium fluoride coating is deposited on glass, then the standard procedure requires baking of the coated glass element at a temperature between 300° C. and 500° C. Plastics suitable for optical use are not able to maintain dimensional stability and often oxidize at these temperatures and would be destroyed by the baking process.

Other coating processes on plastic for increased durability of the surface have been attempted by dipping the substrate into a solution of the coating material and then removing the substrate. See, for example, U.S. Pat. No. 3,953,115. The problem with coating in this manner is that there is virtually no control over the film thickness. The films do not shown improved durability at thicknesses less than 1 micron and are too thick and non-uniform to be of use as an optical coating on the involved geometry of a lens. It is known to apply similar coatings to glass by plasma polymerization employed as a light guide, see for example, U.S. Pat. No. 3,822,928, but the problem of obtaining a well-adhered coating on an optical plastic substrate has remained until now.

SUMMARY OF THE INVENTION

The above and other disadvantages of prior art methods of providing an anti-abrasion coating for a plastic lens are overcome by the present invention of a method comprising the steps of exposing the substrate in an evacuated plasma polymerization reactor chamber to a first plasma that forms hydroxyl groups on the lens surface, evacuating the reactor chamber, exposing the substrate in the reactor chamber to a second or monomer plasma for a predetermined time and at a predetermined pressure to produce a coating of the monomer on the substrate to a thickness that is less than 3000 nm, 100 nm ± 20 nm being most preferred, evacuating the reactor chamber, and exposing the substrate to third plasma for a predetermined time at a predetermined pressure. The substrate is finally removed from the reactor chamber. In the preferred embodiment of the invention, the first, hydroxyl group forming plasma is selected from hydrogen, oxygen, air and water vapor, water vapor being most preferred. The second or monomer plasma is a silicon containing monomer and is preferably selected from at least one of the group consisting of vinyltrimethylsilane, vinyltrimethylethoxysilane, vinyldimethylethoxysilane, and hexamethyldisilizane. The monomers can be mixtures of these components, the preferred mixture being a 50-50 mixture (by volume) of vinyldimethylethoxysilane and hexamethyldisilizane. The third plasma is selected from one of the noble gases, oxygen, nitrogen and air, argon being the most preferred.

During the step of exposing the substrate to the first plasma, the pressure within the reactor chamber is maintained at approximately 15–25 $nt/m^2$. If $H_2O$ plasma is employed, it can be produced by ionizing $H_2O$ vapor within the reactor chamber by generating an RF current, for example, at 60 watts of power by 13.56 mHz for 300 seconds.

One important step of the above-described method is the preliminary step of subjecting the substrate to the hydroxyl group forming plasma vapor. It is believed that it is this step which allows for the good adherence qualities of the coating. Previously known methods of applying such coatings to such substrates, such as glass, for example, did not involve this step. See, for example U.S. Pat. No. 3,822,928. It should be noted that the purpose in providing the coating in the aforementioned patent was not to provide an abrasion resistant coating, but simply to provide a thin film light guide coating on a glass substrate.

A second important step in the above-described method is the step of subjecting the coated substrate to a third plasma after the monomer is deposited. The third plasma, preferably argon plasma, is at a pressure of 10–30 $nt/m^2$ at 30–300 watts of RF power. The bombardment is undertaken for a time period ranging from 200 to 1,000 seconds. The theory behind this treatment by, for example, argon plasma, is to cross-link and stress-relieve the polymer films by ultraviolet radiation, temperature elevation, and electron bombardment. As stated previously, in other less preferred embodiments of the present method, oxygen, air, nitrogen, and other noble gases may be used for the plasma generation.

It is, therefore, an object of the present invention to provide a well-adhered durable, optical coating for an optical plastic substrate by the process of plasma polymerization.

It is another object of the invention to provide an injection molded optical plastic lens having a well-adhered anti-abrasion coating.

It is still a further object of the invention to provide a low temperature method for depositing an anti-abrasion coating on an optical plastic substrate.

It is yet another object of the invention to provide a low cost method of applying an anti-abrasion coating to a plastic lens.

It is a further object of the invention to provide a method of depositing an anti-abrasion coating to a plastic lens, irrespective of the lens curvature.

The foregoing and other objectives, features and advantages of the invention will be more readily understood upon consideration of the following detailed description of certain preferred embodiments of the invention, taken in conjunction with the accompanying drawing.

BRIEF DESCRIPTION OF THE DRAWING

The FIGURE is a diagrammatic illustration of a plasma polymerization reactor.

DETAILED DESCRIPTION OF THE PREFERRED EMBODIMENT

Referring now more particularly to FIG. 1, a typical plasma polymerization coating reactor 10 is illustrated as having an enclosed chamber 12, a "hot" electrode 14, ground electrode 16 spaced from the hot electrode 14, and a substrate holder 18 positioned between the electrodes 14 and 16. The monomer to be deposited on the substrate is fed in through an inlet pipe 20 which exits through a hole in the hot electrode 14. An exit 22 is provided in the chamber 12 and is connected to a trap and a vacuum pump 23. The electrode 16 is connected to the circuit ground and a current probe (not shown). The interior of the chamber 12 is monitored by a pressure gauge 24. The hot electrode 14 is connected to an adjustable RF power supply 26. A substrate 28, for example, a plastic lens to be coated, is fixtured midway between the electrodes 14 and 16 which are spaced approximately 2 inches apart. Positioning the substrate between the electrodes, as opposed to resting it on the lower electrode 16, permits both sides of the substrate 28 to be coated simultaneously. The lens holder 18 is electrically isolated from the lower electrode 16 by legs or other means of support made of an electrically insulating material, such as polytetrafluoroethylene, known under the trademark Teflon. The chamber 12 may be a glass bell jar placed over the electrode assembly. The chamber 12 is evacuated to a background pressure of less than 0.67 nt/m² to remove any reactants available in the room atmosphere.

Prior to its insertion into the chamber, the optical plastic substrate 28 is cleaned to remove contaminants and to improve adhesion of the coating. As an illustration of such a cleaning step, the substrate can be dipped into a first solvent, such as DuPont Freon ® solvent TWD 602 to remove water soluble contaminants. The substrate can then be rinsed in a second solvent such as DuPont Freon ® TF to remove the first solvent. The substrate can then be vapor degreased in DuPont Freon ® TF vapor and allowed to dry before insertion into the reactor.

The polymerization process for coating the substrate 28 is then begun by the following steps. After the initial evacuation, a vessel (not shown) containing the hydroxyl group forming plasma, for example distilled H₂O, is exposed to the inlet 20 of the reactor 10. A throttling valve 30 is located between the reactor and the vacuum pump 23 to limit the pumping rate. A flow valve 32 is positioned in the inlet line 20 to control the input flow. The throttling valve 30 and the flow valve 32 are adjusted to yield 15–25 nt/m² of pressure within the reactor.

The hydroxyl group forming vapor is then ionized by the RF generator into plasma. High frequency voltage is applied across the electrodes by means of the RF supply with its associated impedance matching network 26 to initiate and sustain the plasma. The plasma is very uniform as evidenced by the uniform glow and is confined to an area primarily between the two electrodes 14 and 16. The power output is approximately 30–300 watts and is used for approximately a 100–1000 second duration. Hydroxyl groups (OH—) are thus deposited or grated as a tenacious intermediate layer which results in improved adhesion of a later-deposited protective layer to the plastic substrate. This was borne out by the applicant's experiments which showed that films deposited without the pretreatment of hydroxyl group forming plasma bombardment on optical plastic substrates would not pass the standard military specification adhesion test for optics as spelled out in MIL-C-675A. This test involves the placing of adhesive tape on the film and removing it to examine the film adherence. Films deposited on PMMA (polymethylmethacrylate) without the pretreatment failed the test, whereas those deposited in conjunction with the pretreatment of, for example, H₂O vapor plasma, repeatedly passed the test.

Following the hydroxyl group forming first plasma bombardment step, the chamber 12 is evacuated and pumped to less than 0.67 nt/m² of pressure. Once this evacuation has been completed, a vessel (not shown) of the monomer to be coated by plasma polymerization on the substrate is exposed to the inlet pipe 20 of the reactor 10. Once again, flow is restricted by the flow valve 32 and evacuation is limited by the throttling valve 30. The monomer is then coated on the substrate by plasma polymerization under conditions more fully described hereinafter. Suitable monomers have been found to include vinyltrimethylsilane, vinyltrimethylethoxysilane, vinyldimethylethoxysilane, hexamethyldisilizane, as well as several mixes of silanes. All ratios for mixtures were by volume and are not to be considered absolute ratios. The following mixtures were found to be successful: 50% hexamethyldisilizane/50% vinyltrimethylethoxysilane; 50% vinyltrimethylsilane/50% hexamethyldisilizane; and 50% vinyldimethylethoxysilane/50% hexamethyldisilizane. The most successful of all of the above mixtures proved to be a mixture of 50% vinyldimethylethoxysilane/50% hexamethyldisilizane.

The conditions for deposition were approximately as follows: flow rate of 1 to 5 cc/min. at STP (air). Pressure was in the range of 6.67 to 13.33 nt/m². The RF power of the reactor was 20 to 60 watts RMS with an RMS current in the range of 1.24 to 2.07 amps.

Deposition rates were in the range of 0.1 to 0.25 nm/sec. of thickness of the coating. It was found that the films coated onto the substrate must be less than 3000 nm in thickness as at that point the internal film stresses are high enough to allow delamination of the film from the substrate. The average index of refraction of these films is 1.50. When the film was deposited on PMMA, with an index of 1.49, no anti-reflection behavior is exhibited due to the matching indices of refraction. However, if the substrate is chosen to be an optical plastic other than PMMA and having a higher refractive index then by monitoring the thickness of the coating to be an odd multiple of $\frac{1}{4}$ of the expected mid-wavelength to which the optical substrate will be subjected, then the coating will also serve as an anti-reflection coating. Such substrates could be a polystyrene, or a polycarbonate such as is marketed under the trademark LEXAN ® by General Electric and DYLARK ® by Arco. DYLARK ® is a polystyrene-PMMA co-polymer.

The duration of the deposition is monitored and is used to control film thickness. The plasma is extinguished at the end of a predetermined deposition time by turning off the RF power to the electrodes 14 and 16. After the deposition of the coating has been thus terminated, the system is again evacuated to less than 0.67 nt/m². A third gas such as argon is then flowed into the reactor through the inlet 20 and is metered by means of the valves 30 and 32 until a pressure of approximately 20 nt/m² is achieved within the reactor. A plasma is then struck by applying the RF power between the electrodes 14 and 16 at a power of 100 watts. This plasma is generated for a period between 200 to 1,000 seconds or more. The purpose of the post plasma treatment is to cross-link and stress-relieve the polymer films by ultraviolet radiation, temperature elevation and electron bombardment. Although argon is preferred, oxygen, air, nitrogen, and other noble gases such as helium are also possible.

After the bombardment by the third plasma, the system is evacuated to less than 0.67 nt/m² and the vacuum is broken to room atmosphere so that the substrate may be removed. During all of the plasma generation stages, the flow rate is in the range of 1 to 5 cc/min. at STP (air). The throttling valve 30 utilized in the experiments yielding the above data was a Nupro SS-12VAN, two and one-half turns lock to lock right angle bellows valve. During the pretreatment of the substrate by the hydroxyl group forming plasma, the throttle valve 30 is typically one-quarter turn open, one-half turn open during the post treatment with third plasma. The flow valve 32 is utilized in the generation of the above data was a Granville-Phillips series 203 manually operated variable leak valve. The setting on the flow valve 32 during the pretreatment with hydroxyl group forming plasma was typically 90, 92 during deposition, and 78 during the post treatment with the third plasma. These settings could vary by a plus or minus 5 depending upon the variation in the ambient atmospheric conditions.

The invention is further illustrated by the following non-limiting examples:

EXAMPLE I

The grounded lower electrode 16 was electrically isolated from the metal support plate 18 to prevent current from flowing through the lower electrode and the support plate. The support plate 18 was in turn isolated from the metal base plate of the vacuum system, which was further isolated from the ground. All gas flow lines (monomer inlet, vacuum pump and pressure gauge) were joined with lengths of glass tubing to prevent possible grounding through the instrumentation of the pumping system.

This spacing between the electrodes 14 and 16 was kept at 5.0 cm and the area of each electrode was 182 cm². The samples to be coated were located midway between the electrodes and were supported by an aluminum table with Teflon ® legs. The table rested on the lower electrode 16.

The voltage applied to the upper electrode 14 was measured with a Tektronix P 601 3A voltage probe; the current-to-ground was measured with a Tektronix P 6021 current probe. Forward and reflected power were read from the wattmeter incorporated into the 13.56 MHz RF power supply 26.

A PMMA substrate was masked with a glass cover slip, then subjected to H₂O vapor plasma and then coated with a monomer mixture of 50% hexamethyldisilizane/50% vinyldimethylethoxysilane to a thickness of 550 nm. The sample was then argon post treated as described above.

The sample passed the tape pull adhesion test. A standard MIL spec rubber eraser was used under a force loading of 2.25 lbs./in.² and abraded for 20 rubs. The "step" thereby produced was then photographed under a light microscope of 40 power magnification with dark field illumination. After the abrasion test, the sample was cleaned with a standard lens cleaning solution and lens paper. Subsequent inspection evidenced the increased durability of the coated surfaces. The only scratches which did go into the coated surface were due to small "hot spots" of pumice in the eraser which caused force loading to increase by orders of magnitude because the force applied to the eraser was transferred through a point contact to the coating rather than being distributed over the whole surface of the pad.

Coatings produced by the foregoing described method have shown a high resistance to attack by water, Freon ® and standard lens cleaning solutions. Also, the coatings show no evidence of delamination, discoloration or cracking when stored at temperatures of 170° F. (76.67° C.) for 168 hours.

EXAMPLE II

A number of monomers were coated on various substrates according to the procedure outlined in Example I. The coatings of Table I were applied without the use of any hydroxyl group forming plasma or post treatment plasma.

In Table II, substrates were pretreated with the hydroxyl group forming plasma but not with the post treatment plasma.

In Table III, substrates were coated according to the present invention, i.e., both plasma treatment steps were carried out. When argon was used, a most superior coating was achieved.

TABLE I

| MONOMER | PRESSURE | POWER | DURATION | THICKNESS | SUBSTRATE | REMARKS |
| --- | --- | --- | --- | --- | --- | --- |
| Vinyltrimethylsilane | 30–100μ | 15–60W | 1200–1500sec. | 1000–1600A | Glass PMMA | Powder formed. No adhesion. Poor durability. |
| Tetramethylsilane | 50μ | 30W | 1200sec. 50–70μ | 0 15–100W | Glass PMMA | No deposition. Would not polymerize. |
| Vinyldimethylethoxysilane | 60–100μ | 30–100W | 1200– | 1000– | Glass | Sporatic adhesion. Good |

TABLE I-continued

| MONOMER | PRESSURE | POWER | DURATION | THICKNESS | SUBSTRATE | REMARKS |
| --- | --- | --- | --- | --- | --- | --- |
| | | | 3000sec. | 6000A | PMMA | durability. High deposition rate. |
| Dimethyldiethoxysilane | 35–70μ | 30W | 1200sec. | 0 | Glass | No polymerization. No deposition. |
| Hexamethyldisilizane | 30–100μ | 30–100W | 1200sec. | 0–500A | Glass PMMA | Very low deposition rate. Tenacious adhesion. Poor durability. |
| 50% (vol.) Hexamethyldisilizane 50% (vol) Vinyltrimethoxysilane | 72μ | 60–100W | 1200–1400sec. | 0 | PMMA | Very low deposition rate No adhesion. Poor durability. |
| 50% (vol.) Hexamethyldisilizane 50% (vol.) Vinyltrimethylsilane | 50–200μ | 60W | 1200sec. | 1000–1300A | PMMA | Large amounts of powder found. |
| 50% (vol.) Hexamethyldisilizane 50% (vol.) Vinyldimethoxysilane | 50–135μ | 30–100W | 1200sec. | 400–1000A | PMMA | Poor adhesion. Sporatic durability. Low deposition rate. |
| Vinyltrimethoxysilane | 50–200μ | 30–100W | 1200–2000sec. | 1000A–2microns | PMMA LEXAN | Sporatic adhesion. Sporatic durability. |
| Hexamethyldisiloxane | 50–70μ | 15–100W | 2000–3000sec. | 4000–6000A | LEXAN | Poor abrasion resistance, Excessive powder formation. Moderate adhesion. |

TABLE II

| GAS | PRESSURE | POWER | DURATION | SUBSTRATE | REMARKS |
| --- | --- | --- | --- | --- | --- |
| Oxygen | 100–200μ | 30–75W | 100–300sec. | PMMA | Improved VTMS film but too reactive due to sputtering polymer. |
| Helium | 250μ | 75W | 100–300sec. | PMMA | Sporatic improvement in durability and adhesion. Majority fail adhesion test. |
| Air | 100μ | 75 | 150sec. | PMMA | Sporadic improvement. Films partially fail adhesion test. |
| H$_2$O | 50–115μ | 30–60W | 100–400sec. | PMMA LEXAN Styrene Polymer | Films show good adhesion. |

TABLE III

| GAS | PRESSURE | POWER | DURATION | SUBSTRATE | REMARKS |
| --- | --- | --- | --- | --- | --- |
| Argon | 70–150μ | 60–100W | 100–900 sec. | PMMA LEXAN Styrene Polymer | Improved abrasion resistance without film sputtering. |
| Helium | 70μ | 20W | 100–15000sec. | PMMA | Poor adhesion. Poor durability |

What is claimed is:

1. A method of coating an optical plastic substrate with an abrasion resistant coating comprising the sequential steps of:
   a. exposing the substrate in an evacuated plasma polymerization reactor chamber to a first plasma that forms hydroxyl groups on said substrate surface,
   b. evacuating the reactor chamber,
   c. exposing the substrate in the reactor chamber to a second plasma, said second plasma being a polymerizable monomer to produce a coating of the monomer on the substrate, the coating being less than 3000 nm thick and wherein the monomer contains silicon,
   d. evacuating the reaction chamber,
   e. exposing the substrate to a third plasma for a predetermined time at a predetermined pressure, said third plasma being selected from the group consisting of noble gases, oxygen, nitrogen, and air, and
   f. removing the substrate from the reactor chamber.

2. The method of coating an optical plastic substrate as recited in claim 1 wherein said first plasma is selected from the group consisting of oxygen, hydrogen, air and water vapor.

3. The method of coating an optical plastic substrate as recited in claim 1 wherein said third plasma is employed to cross-link and stress-relieve the silicon monomer and is selected from the group consisting of a noble gas, oxygen and nitrogen.

4. The method of coating an optical plastic substrate as recited in claim 1 wherein said first plasma is water vapor and said third plasma is argon.

5. A method of coating an optical plastic substrate as recited in claim 1 wherein said monomer is selected from the group consisting of vinyltrimethylsilane, vinyltrimethylethoxysilane, vinyldimethylethoxysilane, hexamethyldisilizane, and mixtures thereof.

6. The method of coating an optical plastic substrate as recited in claim 1 wherein exposure of the substrate to the first plasma is undertaken at a pressure of about 15 to 25 nt/m$^2$ within the reactor chamber.

7. The method of coating an optical plastic substrate as recited in claim 5 wherein the step of producing the monomer coating is undertaken at a flow rate of 1 to 5 cc/min. at standard temperature and pressure, with an interior pressure within the reactor chamber in the range of 6.67 to 13.33 nt/m$^2$ and at an RF power of 20 to 60 watts RMS with an RMS current in the range of 1.24 to 2.07 amps.

8. The coating of an optical plastic substrate as recited in claim 7 wherein the step of producing the monomer coating on the substrate is undertaken at a deposition rate in the range of 0.1 to 0.25 nm/sec.

9. A method of coating an optical plastic substrate as recited in claim 5 wherein the step of exposing the substrate to the third plasma is undertaken at a pressure of 20 nt/m² at 100 watts of RF power for 200 to 1,000 seconds.

10. A method of coating an optical plastic substrate as recited in claim 9 wherein the third plasma is argon.

11. A method of coating an optical plastic substrate as recited in claim 5 wherein the monomer is a mixture of approximately 50% hexamethyldisilizane and 50% vinyl dimethylethoxysilane by volume.

12. The method of coating an optical plastic substrate as recited in claim 5 wherein the monomer is a mixture of approximately 50% vinyltrimethylsilane and 50% hexamethyldisilizane by volume.

13. The method of coating an optical plastic substrate as recited in claim 5 wherein the monomer is a mixture of approximately 50% vinyltrimethylethoxysilane and 50% hexamethyldisilizane.

14. The method of coating an optical plastic substrate as recited in claim 1 further comprising the step of cleaning the substrate prior to the step of exposing the substrate in the reactor chamber to the first plasma by dipping the substrate in a first solvent to remove water soluble contaminants and then rinsing the substrate in a second solvent to remove the first solvent and finally vapor degreasing the substrate and allowing the substrate to dry before insertion into the plasma reactor.

15. The method of coating an optical plastic substrate as recited in claim 1 wherein said substrate is polymethylmethacrylate.

16. The method of coating an optical plastic substrate as recited in claim 1 wherein said substrate is a polycarbonate.

17. The method of coating an optical plastic substrate as recited in claim 1 wherein said substrate is a polystyrene.

18. The method of coating an optical plastic substrate as recited in claim 1 wherein said substrate is a polystyrenepolymethylmethacrylate copolymer.

19. A method of coating an optical plastic substrate as recited in claim 1 wherein the optical plastic substrate has a higher refractive index than the refractive index of the monomer coating and the monomer coating is deposited to have an optical thickness equal to an odd multiple of ¼ of the wavelength of the midpoint of the light range over which the substrate is to be utilized.

20. A coated optical plastic substrate produced according to the method of claim 1.

21. An optical plastic substrate having an abrasion resistant coating comprising:
   a. an optical plastic substrate selected from the group consisting of polymethylmethacrylate, a polycarbonate, a polystyrene, and a polystyrene-polymethylmethacrylate copolymer,
   b. an interlayer hydroxyl group coating on at least one surface of the substrate, and
   c. an outer, plasma polymerized monomer coating over the hydroxyl interlayer, the monomer being selected from the group consisting of vinyltrimethylsilane, vinyltrimethylethoxysilane, vinyldimethylethoxysilane, hexamethyldisilizane and mixtures thereof.

22. A coated optical plastic substrate as recited in claim 21 wherein the combined interlayer and monomer coating is chosen to have a lower refractive index than the refractive index of the optical plastic substrate and has an optical thickness equal to an odd multiple of ¼ of the wavelength of the midpoint of the light range over which the substrate is to be utilized.

* * * * *